United States Patent [19]
Heineke et al.

[11] Patent Number: 5,817,592
[45] Date of Patent: Oct. 6, 1998

[54] PROCESS FOR THE PREPARATION OF A HYDROGENATION CATALYST

[75] Inventors: Daniel Heineke; Heinz-Walter Schneider, both of Ludwigshafen; Alfred Thomé, Speyer, all of Germany

[73] Assignee: BASF Aktiengesellschaft, Ludwigshafen, Germany

[21] Appl. No.: 590,455

[22] Filed: Jan. 23, 1996

[30] Foreign Application Priority Data

Jan. 27, 1995 [DE] Germany .......................... 195 02 580.6

[51] Int. Cl.⁶ .......................... B01J 21/18; B01J 27/185; B01J 23/42; B01J 23/16
[52] U.S. Cl. .......................... 502/185; 502/162; 502/164; 502/210; 502/213; 502/215; 502/221; 502/223; 502/302; 502/311; 502/313; 502/339; 502/353
[58] Field of Search ...................... 502/185, 162, 502/164, 210, 213, 215, 221, 223, 302, 311, 313, 339, 353

[56] References Cited

U.S. PATENT DOCUMENTS

| | | | |
|---|---|---|---|
| 2,823,101 | 2/1958 | Jockers et al. | 23/117 |
| 3,966,635 | 6/1976 | El-Ghatta et al. | 502/26 |
| 4,889,704 | 12/1989 | Fuchs et al. | 423/387 |
| 4,895,711 | 1/1990 | Biffar et al. | 423/387 |
| 4,956,331 | 9/1990 | Tsurumi et al. | 502/339 |
| 5,120,699 | 6/1992 | Weiss et al. | 502/185 |
| 5,155,081 | 10/1992 | Steigleiter et al. | 502/185 |
| 5,227,146 | 7/1993 | Heitner | 423/387 |
| 5,496,789 | 3/1996 | Weiss et al. | 502/339 |
| 5,560,895 | 10/1996 | Weiss et al. | 423/352 |

FOREIGN PATENT DOCUMENTS

| | | | |
|---|---|---|---|
| 308 719 | 3/1989 | European Pat. Off. | B01J 23/42 |
| 956038 | 1/1957 | Germany . | |
| 4022851 | 7/1990 | Germany | B01J 35/10 |
| 4022853 | 7/1990 | Germany | B01J 35/10 |
| 1197619 | 7/1970 | United Kingdom | B01J 11/08 |

OTHER PUBLICATIONS

Anderson, Academic Press, 1975, "Structure of Metallic Catalysts", pp. 164–243. month N/A.

Zimalkowski, Ferdinand Enke Verlag, Stuttgart, "Katalytische Hydrierungen im . . . ", 1965. month N/A.

*Primary Examiner*—Mark L. Bell
*Assistant Examiner*—Patricia L. Hailey
*Attorney, Agent, or Firm*—Keil & Weinkauf

[57] ABSTRACT

A process for the preparation of a hydrogenation catalyst by reduction of platinum in an oxidation stage of not less than 2 in an aqueous medium in the presence of a carboniferous support, optionally following partial poisoning with a sulfur, arsenic, tellurium, or antimony-containing compound, using a reducing agent, in which the reducing agent used is an ammonium or phosphonium salt of the general formula I $$[XR^4]_n Y \qquad \mathrm{I}$$

in which X stands for N or P, R stands for hydrogen, $C_1$—$C_{18}$ alkyl, $C_5$—$C_{10}$ cycloalkyl, phenyl radical, and also a $C_1$—$C_4$ alkyl radical substituted by phenyl, the phenyl radicals being mono-to tri-substituted by $C_1$—$C_6$ alkyl, halogen, nitro or amino, if desired, provided that the radicals R may be the same or different but cannot simultaneously denote hydrogen, if X is P, n is an integer of 1 to 3, and Y is an organic anion which can reduce platinum in an oxidation stage other than zero to platinum in the oxidation stage of zero.

10 Claims, No Drawings

PROCESS FOR THE PREPARATION OF A HYDROGENATION CATALYST

DESCRIPTION

The present invention relates to a process for the preparation of a hydrogenation catalyst by reduction of platinum in an oxidation stage of not less than 2 in an aqueous medium in the presence of a carboniferous support, optionally following partial poisoning with a sulfur, arsenic, tellurium, or antimony-containing compound, using a reducing agent.

In addition, the invention relates to a hydrogenation catalyst, prepared in the process of the invention, to the use thereof for the preparation of hydroxylammonium salts, to a process for the preparation of hydroxylammonium salts, and also to a process for the regeneration of hydrogenation catalysts based on platinum.

Nobel metals such as palladium, platinum, or ruthenium, applied to diverse supports such as silicon dioxide, aluminum oxide, graphite, or activated charcoal, are well suited for the hydrogenation of organic and inorganic compounds, as revealed in "Katalytische Hydrierungen im organisch chemischen Laboratorium", F. Zimalkowski, Ferdinand Enke Verlag, Stuttgart (1965).

An important factor governing the activity of these catalysts is the high degree of dispersion of the noble metal required on the catalyst support. A drawback from the process engineering point of view (cf "Structure of Metallic Catalysts", J. R. Anderson, Academic Press (1975), pp 164 et seq) is the fact that under the reaction conditions the particle size of the applied noble metal increases due to agglomeration, the degree of dispersion decreases and also the elementary noble metal becomes detached from the support material.

DE-C 4,022,853 reveals that the selectivity toward hydroxylamine in the hydrogenation of nitrogen monoxide can be raised by the use of platinum-on-graphite catalysts having a graphite grain size between 1 and 600 mm.

DE-PS 956,038 has disclosed platinum-on-graphite catalysts which are obtained by precipitation of platinum on to suspended graphite supports, optionally with the addition of poisoning agents such as sulfur, selenium, arsenic, or tellurium compounds. Such catalysts are well suited for the catalytic hydrogenation of nitrogen monoxide. These catalysts suffer from the drawback that the reactivity and selectivity decrease rapidly.

DE-C 4,022,851 reveals that in the preparation of hydroxylamine by hydrogenation of nitrogen monoxide in the presence of platinum-on-graphit catalysts, the selectivity bears a relationship to the apparent density, the pressure-resistance, and the porosity of the graphite support.

The catalysts used in the process for the aforementioned German patent specifications suffer from the drawback that only relatively short on-stream times of the catalysts can be achieved due to agglomeration of the active components.

Thus the object of the present invention is to provide an improved process for the preparation of hydrogenation catalysts which guarantees longer on-stream times of the catalysts used giving at least identical selectivity and a high space-time yield. In addition it is desirable to achieve minimization of the by-products, particularly of the dinitrogen monoxide.

Accordingly, we have found a process for the preparation of a hydrogenation catalyst by reduction of platinum in an oxidation stage of not less than 2 in an aqueous medium in the presence of a carboniferous support, optionally following partial poisoning with a sulfur, arsenic, tellurium, or antimony-containing compound, using a reducing agent, in which the reducing agent used is an ammonium or phosphonium salt of the general formula I

$$[XR_4]_nY \qquad I$$

in which X stands for N or P, R stands for hydrogen, $C_1$—$C_{18}$ alkyl, $C_5$—$C_{10}$ cycloalkyl, phenyl radical, and also a $C_1$—$C_4$ alkyl radical substituted by phenyl, the phenyl radicals being mono- to tri-substituted by $C_1$—$C_6$ alkyl, halogen, nitro or amino, if desired, provided that the radicals R may be the same or different but cannot simultaneously denote hydrogen, if X is P, n is an integer of 1 to 3, and Y is an organic anion which can reduce platinum in an oxidation stage other than zero to platinum in the oxidation stage of zero.

In addition we have found a hydrogenation catalyst, prepared by the process of the invention, the use thereof for the preparation of hydroxylammonium salts, a process for the preparation of hydroxylammonium salts, and also a process for the regeneration of hydrogenation catalysts based on platinum.

The process of the invention differs from the prior processes substantially in the fact that the reducing agent used for the reduction of platinum in an oxidation stage other than zero to metallic platinum (oxidation stage zero) is a reducing agent of the general formula I

$$[XR_4]_nY \qquad I$$

in which X stands for N or P, R stands for hydrogen, $C_1$—$C_{18}$ alkyl such as methyl, ethyl, n-propyl, i-propyl, n-butyl, isobutyl, t-butyl, n-pentyl, n-hexyl, n-heptyl, n-octyl, n-nonyl, n-decyl, n-undecyl, n-dodecyl (lauryl), n-tridecyl, n-tetradecyl, (myristyl), n-pentadecyl, n-hexadecyl (palmityl), n-heptadecyl and n-octadecyl (stearyl), preferably hydrogen, methyl, ethyl, n-propyl, isopropyl, n-butyl, n-hexadecyl (palmityl) and n-octadecyl (stearyl); $C_5$—$C_{10}$ cycloalkyl such as cyclopentyl, cyclohexyl, cycloheptyl, cyclooctyl, cyclononyl, cyclodecyl, particularly cyclopentyl and cyclohexyl; the phenyl radical and also $C_1$—$C_4$ cycloalkyl substituiert by phenyl, where the phenyl radicals may be mono- to tri-substituted by $C_1$—$C_6$ alkyl such as methyl, ethyl, n-propyl, n-butyl, n-pentyl, n-hexyl, preferably methyl, ethyl, n-propyl, isopropyl, t-butyl, such as phenyl, tolyl, benzyl, mesityl, supermesityl, provided that the radicals R may be the same or different but cannot simultaneously denote hydrogen, if X is P, and n is an integer of 1 to 3 and Y an organic anion which can reduce platinum in an oxidation stage other than zero to platinum in the oxidation stage of zero.

Particularly preferred acid anions Y are those of formic acid, acetic acid, citric acid, oxalic acid, and ascorbic acid.

Particularly preferred compounds are those in which R stands for hydrogen, $C_1$—$C_{16}$ alkyl such as ammonium formate, tetramethylammonium formate, tetraethylammonium formate, tetrapropylammonium formate, tetraisopropylammonium formate, tetrabutylammonium formate, and palmityltributylammonium formate.

In a preferred embodiment, the reduction is carried out in the presence of a salt OZ, where O denotes an alkali metal cation or an alkaline earth metal cation of the metals lithium, sodium, potassium, magnesium, and calcium, sodium, being particularly preferred, and Z denotes an anion selected from the group consisting of halogen, such as chlorine and bromine, preferably chlorine, sulfate, hydrogen sulfate, phosphate, and nitrate.

In another preferred embodiment, the anions and cations of the reducing agent I and salt OZ are used in interchanged relationship, ie as $[XR_4]Z$ and $O_nY$, a preferred pair of salts being sodium formate and tetrabutylammonium hydrogen sulfate.

In another preferred embodiment, use may be made of a reducing agent comprising an equimolar mixture of an ammonium salt containing an anion Z and sodium formate, preferably sodium formate and a tetra($C_1$—$C_4$ alkyl) ammonium salt, more preferably sodium formate and a tetra-n-butylammonium salt and most preferably sodium formate and tetra-n-butylammonium chloride or tetra-n-butylammonium hydrogen sulfate.

The preparation of the hydrogenation catalysts is usually carried out in known manner (cf DE-C 4,022,853) by reducing a platinum(IV)compound to platinum(O) in aqueous solution in the presence of a carboniferous support. Agents for partial poisoning of the catalyst are added advantageously after the solution has been buffered with alkali metal acetate.

If the poisoning agent used is a compound which is capable of reducing platin(IV) to platin(II) (eg sodium dithionite), the reduction is advantageously first of all carried out as far as the stage of platinum(II). The end point of this reaction is shown by a sharp change in the potential measured during reduction. Partial poisoning is then effected by the addition of a specific amount in excess of that required for the reduction of the platin(IV) to platin(II). Reduction is then usually carried out with a reducing agent of the formula I.

If use is made of a poisoning agent comprising a compound which does not reduce reducing platinum(IV) to platinum(II) under the reaction conditions, platin(IV) can be directly precipitated to platinum(O) with a reducing agent of the formula I.

Suitable platinum(IV) compounds are, in particular, the water-soluble compounds such as hexachloroplatinic acid and its alkali metal and ammonium salts.

The molar ratio of platinum used to reducing agent of the formula I is usually 1000:1 to 10:1 preferably 100:1 to 20:1.

The carboniferous support used is usually suspended graphite or an activated charcoal, particularly electrographite types, particularly preferred being electrographite types such as have a grain size in the range extending from 0.5 to 600 μm, preferably from 2 to 50 μm. The amount of platinum is generally from 0.2 to 2, preferably from 0.3 to 1 wt %, based on the total weight of the platinum-on-graphite catalyst.

The reduction of the platinum is generally carried out in an aqueous solution, the ratio by weight of water to platinum usually being from 1000:1 to 100:1, preferably from 500:1 to 1 00:1.

In addition the reduction is carried in a slightly acid medium, the pH usually being from 4.5 to 7, preferably from 5 to 6. Adjustment of the pH is generally carried out by the addition of buffering salts such as alkali metal acetate, particularly sodium acetate.

In a preferred embodiment the reducing agent used is sodium dithionite and only sufficient thereof is added to cause the potential of the solution, which is measured using a glass electrode, to be in a range extending from 420 to 500 mV, preferably of 440 to 480 mV. On completion of the reduction of the platinum(IV) to platinum(II), which is signified by a sharp change in the potential, there is generally added an amount of sodium dithionite in excess of the amount required to effect reduction of the platinum(IV) to platinum(II) until a specified potential is reached. This potential characterizes the degree of poisoning of the catalyst and is in a range extending from 200 to 440 mV, preferably from 270 to 340 mV.

In another preferred embodiment the catalyst is partially poisoned without previously reducing the platinum(IV) to platinum(II) by the addition of conventional poisoning agents based on sulfur, selenium, arsenic or tellurium such as sodium dithionite, alkali metal thiosulfate, arsenic, hydrogen sulfide, alkali metal sulfide, alkali metal polysulfide, thiourea, telluric acid, or arsenic acid and mixtures thereof.

The molar ratio of platinum to the poisoning sulfur, selenium, arsenic or tellurium is usually in a range extending from 20:1 to 3:1, preferably of 1 0:1 to 5:1.

Partial poisoning is usually carried out by known methods as described, for example, in DE-C 4,022,853.

The reduction to metallic platinum is usually carried out immediately following partial poisoning, if carried out.

The molar ratio of reducing agent of the general formula I to platinum is usually in a range extending from 1000:1 to 1 0:1, preferably 100:1 to 20:1.

The temperature during reduction is generally in a range extending from 50° to 95° C., preferably from 60° to 90° C.

In addition the process is advantageously carried out under atmospheric pressure.

The pH used during reduction to metallic platinum depends substantially on the type of reducing agent used. Since the reducing agents of the general formula I constitute buffering systems, the pH usually depends on the pks-value of the reducing agents and the pH-ranges buffered by the reducing agent.

On completion of reduction, the catalyst is usually worked up in conventional manner, for example by removing it from the reaction mixture by filtration and advantageously washing it with water.

The catalysts obtained in the process of the invention are suitable, according to observations made up to the present time, for the hydrogenation of both organic and inorganic compounds.

Preferably, the catalysts of the invention are used for the hydrogenation of olefinically or acetylenically unsaturated compounds, further for the hydrogenation of carboxylic acids, aldehydes or ketones to the corresponding alcohols or of is nitriles to the corresponding amines. In addition, the catalysts of the invention are suitable for the hydrogenation of inorganic substances such as oxygen, particularly however for the preparation of hydroxylammonium salts by hydrogenation of nitrogen monoxide in aqueous mineral acids.

In the preparation of hydroxylammonium salts usually a molar ratio of hydrogen to nitrogen monoxide of from 1.5:1 to 6:1, preferably from 3:5 to 5:1 is maintained. Particularly good results are obtained, according to observations made up to the present time, when care is taken to ensure that in the reaction zone a molar ratio of hydrogen to nitrogen monoxide of from 3.5:1 to 5:1 is obtained.

Advantageously the acids used are strong mineral acids such as nitric acid, sulfuric acid, or phosphoric acid or aliphatic $C_1$—$C_5$ monocarboxylic acids such as formic, acetic, propionic, butyric and valeric acid, preferably formic acid and acetic acid. Also suitable are acid salts such as ammonium bisulfate. Usually 4 to 6 normal aqueous acids are used and the acid concentration is not usually allowed to fall below 0.2 N during the course of the reaction.

The hydrogenation of nitrogen monoxide is generally carried out at a temperature of from 300° to 80° C., preferably from 350° to 60° C. In addition, the pressure during hydrogenation is usually kept in a range extending from 1 to 30 bar and preferably from 1 to 20 bar (absolute).

The ratio of mineral acid to catalyst depends substantially on the platinum metal and the reactor pressure and is in the case of platinum generally in a range of from 40 1 to 100, preferably 30 to 80 g, of platinum-on-graphite catalyst per liter of mineral acid.

In another preferred embodiment, particularly in the preparation of hydroxylammonium salts, the catalyst is treated with hydrogen, prior to the hydrogenation, in acid solution, advantageously in the mineral acid in which the hydrogenation is to be carried out ("activation").

Spent platinum metal catalyst can be regenerated, in the process of the invention, by dissolving the platinum metal of the catalyst usually in an acid or an acid mixture and separating any insoluble components. The platinum metal salt solution obtained is then neutralized, and the platinum metal salt is then treated according to the process of the invention described above.

The catalysts of the invention are, according to observations made up to the present time, superior to known catalysts used for the same purpose as regards activity, selectivity, and on-stream times.

The process of the invention for the preparation and regeneration of hydrogenation catalysts has the advantage over known processes that it is simpler to carry out and that it also reduces the amounts of waste products produced.

EXAMPLES

The graphite particle size was determined using a MALVERN Mastersizer (cf Verfahrenstechnik 24 (1990) pp 36 et seq). The Fraunhofer diffraction at a wavelength of 1 990 nm was measured. The use of a supplementary lens having a focal length of 300 nm made it possible to determine the particle size distribution in the range of from 1 to 600 $\mu$m.

To effect said measurement, a spatula-tip-full of the powder to be examined was added to one liter of a 0.1 wt % strength aqueous solution of Nekanil® 910 (BASF AG; Nekanil® 910 is a nonylphenol which has been caused to react with 9 to 10 mol of ethylene oxide; properties: waterwhite, viscous liquid; non-ionic, density at 20° C.: 1.04 g/cm$^3$ solidifying point: below −10° C.; pH of a 1 wt % strength solution up to 8.5). Prior to measurement, the resulting mixture to be examined was subjected to supersonics treatment for 1 min.

EXAMPLE 1 a) 40g of a graphite having a particle size of 28.50 $\mu$m and 0.5310 g of hexachloroplatinic(IV) acid hexahydrate were stirred with 40 ml of an aqueous solution containing 3.87 ml of concentrated hydrochloric acid and 0.87 ml of concentrated nitric acid overnight at 80° C. Sodium carbonate was added to the resulting suspension until a pH of 2.75 was reached. 2.5 g of sodium acetate were then added for buffering purposes. There was then added sufficient 4.58wt % strength sodium dithionite solution to reduce the platinum (IV) to platinum(II) (shown by a sharp change in the potential at 460mV).

Poisoning of the catalyst with sulfur was effected using the same sodium dithionite solution as was employed for the reduction of the platinum(IV) to platinum(II), in an excess of 60 mol % over the amount required to reduce platinum (IV) to platinum(II). The potential of the resulting solution, determined using a glass electrode, was 340 mV.

The resulting suspension was subsequently mixed with 10 ml of a 20 wt % strength aqueous tetramethylammonium formate solution stirred for 4 h at 80° C. Following this period platinum could no longer be detected using hydrazine hydrate (gives a black precipitate in alkaline solution in the presence of platinum).

The resulting catalyst was separated from the reaction mixture by filtration through a glass frit and washed with distilled water until the pH of the washings was no longer in the acid range. The dried catalyst contained 0.5 wt % of platinum.

b) 4.8g of the catalyst prepared under a) were suspended in 120ml of 4.3 N sulfuric acid and, at 40° C. with vigorous stirring (3500 rpm), and 7.75 L per hour of a mixture of 35 vol % of nitrogen monoxide and 65 vol % of hydrogen were introduced. After 4 hours the catalyst was separated and the liquid phase analyzed. To the separated catalyst there were then added 120 ml of 4.3 N sulfuric acid and the reaction was continued. This procedure was repeated every four hours. The reaction was terminated when the selectivity toward the dinitrogen monoxide formed exceeded the upper limit set at 10%.

The test results are listed in Table 1.

Comparative Example

Example 1 was repeated except that poisoning was effected using 56 mol % of sodium dithionite excess and that 6.25 ml of concentrated formic acid were used for precipitation of platinum metal. The results achieved are given in Table 1.

EXAMPLE 2

40 g of a graphite sold by Asbury and having a particle size of 28–68 $\mu$m and 0.5310 g of hexachloroplatinum(IV) acid 6 hydrate were stirred overnight at 80° C. with 40 mL of an aqueous solution containing 3.87 mL of concentrated hydrochloric acid and 0.87 mL of concentrated nitric acid. Sodium carbonate was added to the resulting suspension until its pH was 2.75. Then 2.5 g of sodium acetate were added as buffer. To effect partial poisoning of the catalyst, 6.26 mg of elementary sulfur were added and, after a pause of 2 minutes, 41.5 g of a 35% strength aqueous tetraethylammonium formate solution were added to the resulting suspension, and the mixture was stirred for 4 h at 80° C., after which period no more platinum was detectable with hydrazine hydrate (this produces a black precipitate in alkaline solution when platinum is present).

The catalyst thus obtained was isolated from the reaction mixture by filtration through a glass frit and then repeatedly washed with distilled water until the washings no longer showed an acid pH. The dried catalyst contained 0.5% platinum.

b) 3.6 g of the catalyst prepared as described under a) were suspended in 120 mL of 4.3 N sulfuric acid. 7.75 L/h of a mixture of 35 vol % nitrogen monoxide and 65 vol % hydrogen were bubbled through the said suspension at 40° C. with vigorous stirring (3500 rpm). After a period of 4 h, the catalyst was separated and the liquid phase analyzed. 120 ml of 4.3 N sulfuric acid were then added to the separated catalyst, and the reaction was continued. This procedure was repeated once every 4 hours and the reaction was finally stopped when it was found that the selectivity toward the dinitrogen monoxide formed had exceeded the set limit of 5%. The results of these experiments are listed in Table 2.

Comparative Example 2

Example 2 was repeated except that precipitation was effected by the addition of 14 g of a 40% strength sodium formate solution. The results obtained are listed in Table 2.

EXAMPLE 3

Example 2 was repeated except that precipitation was effected by the use of 57.75 g of an aqueous 40% strength tetrabutylammonium formate solution. The results obtained are listed in Table 2.

EXAMPLE 4

Example 2 was repeated except that reduction was effected by the addition of 14 g of an aqueous 40% strength NaHCOO solution to which 27.92 g of tetrabutylammonium hydrogen sulfate had been added.

EAMPLE 5

Example 2 was repeated except that reduction was effected by the addition of 13.07 g of an aqueous 40% strength ammonium formate solution and poisoning was effected by the use of 3.75 mg of elementary sulfur. The results obtained are listed in Table 2.

EXAMPLE 6

Example 2 was repeated except that reduction was effected by the addition of 10 g of a 50% strength tert-butylammonium formate solution.

TABLE 1

| Example | 1 | Comparative Ex. 1 |
|---|---|---|
| Reducing Agent | Me$_4$NHCOO | HCOOH |
| Number of cycles | 17 | 4 |
| Selectivity NH$_2$OH [%] | 88.55 | 85.53 |
| Selectivity NH$_3$ [%] | 7.49 | 6.36 |
| Selectivity N$_2$O [%] | 3.96 | 8.11 |
| NO Conversion [%] | 90.72 | 89.88 |
| Space-time yield | 0.811 | 0.774 |

TABLE 2

| Example | 2 | 3 | 4 | 5 | 6 | C. Ex. 2 |
|---|---|---|---|---|---|---|
| Reducing Agent | Et$_4$NHCOO | Bu$_4$NHCOO | Bu$_4$NHSO$_4$/NaNCOO | NH$_4$HCOO | t-BuNH$_3$HCOO | NaHCOO |
| Number of cycles | 5 | 10 | 7 | 13 | 7 | 4 |
| Selectivity NH$_2$OH [%] | 86.0 | 89.46 | 88.61 | 91.45 | 86.23 | 82.91 |
| Selectivity NH$_3$ [%] | 11.02 | 8.17 | 9.66 | 6.58 | 10.58 | 13.66 |
| Selectivity N$_2$O [%] | 2.92 | 2.38 | 1.73 | 1.97 | 3.11 | 3.44 |
| NO Conversion [%] | 93.88 | 90.19 | 92.96 | 93.05 | 94.5 | 95.57 |
| Space-time yield | 0.817 | 0.817 | 0.832 | 6.859 | 0.823 | 0.799 |

We claim:

1. A process for the preparation of a hydrogeneration catalyst, which process comprises reducing platinum in an oxidation stage of not less than 2 in an aqueous medium and precipitating reduced platinum onto a carboniferous support, optionally following partial poisoning of the platinum by contact thereof with a sulfur, arsenic, tellurium, or antimony-containing compound, wherein reducing of the platinum in an oxidation stage of not less than 2 is effected by contact thereof in an aqueous medium with a reducing agent which is an ammonium or phosphonium salt of the formula I $$(XR_4)_nY$$

in which X stands for N or P, R stands for hydrogen, C$_1$—C$_{18}$-alkyl, C$_5$—C$_{10}$-cycloalkyl, phenyl radical, and also a C$_1$—C$_4$-alkyl radical substituted by phenyl, the phenyl radicals being optionally mono-to tri-substituted by C$_1$—C$_6$-alkyl, halogen, nitro or amino, provided that the radicals R may be the same or different but cannot simultaneously denote hydrogen, if X is P, n is an integer of 1 to 3, and Y is an organic anion which can reduce platinum in an oxidation stage other than zero to platinum in the oxidation stage of zero.

2. A process as defined in claim 1, wherein the reduction is carried out in the presence of a salt OZ, where O denotes an alkali metal cation or an alkaline earth metal cation and Z denotes an anion selected from the group consisting of halogen, sulfate, hydrogen sulfate, phosphate, and nitrate.

3. A process as defined in claim 2, wherein the reduction is carried out in the presence of a salt selected from the group consisting of (XR$_4$)Z and O$_n$Y, the former containing the cation XR$_4$ and the anion Z from the salt OZ, and the latter containing the cation O from the salt OZ and the anion Y from the salt (XR$_4$)$_n$Y, n being an integer from 1 to 3.

4. A process as defined in any of claim 1, wherein the organic anion Y used is an acid anion selected from the group consisting of formic acid, acetic acid, citric acid, and ascorbic acid.

5. A process as defined in any of claim 1, wherein the reducing agent used is a compound selected from the group consisting of ammonium formate, tetraethylammonium formate, tetra-n-butylammonium formate, tetramethylammonium formate and an equimolar mixture of sodium formate and an ammonium salt.

6. A hydrogenation catalyst, obtained by the process of claim 1.

7. A process for the preparation of hydroxylammonium salts by reduction of nitrogen monoxide with hydrogen in the presence of a hydrogenation catalyst, wherein the hydrogenation catalyst used is the hydrogenation catalyst prepared by the process defined in claim 1.

8. A process for the regeneration of a hydrogenation catalyst based on platinum by dissolving the platinum metal in an acid or an acid mixture, neutralizing the solution obtained and reducing the solution with a reducing agent, wherein the reduction to platinum in the oxidation stage of zero, the reducing agent used is an ammonium or phosphonium salt of the formula I $$[XR_4]_nY \qquad I$$

in which X stands for N or P, R stands for hydrogen, C$_1$—C$_{18}$alkyl, C$_5$—C$_{10}$cycloalkyl, phenyl radical, and also a C$_1$—C$_4$alkyl radical substituted by phenyl, the phenyl radicals being optionally mono-to tri-substituted by C$_1$—C$_6$alkyl, halogen, nitro or amino, provided that the radicals R$_4$ be the same or different but cannot simultaneously denote hydrogen, if X is P, n is an integer of 1 to 3, and Y is an organic anion which can reduce platinum in an oxidation stage other than zero to platinum in the oxidation stage of zero.

9. A process as defined in claim 8, wherein the reduction is carried out in the presence of a salt OZ, where O denotes an alkali metal cation or an alkaline earth metal cation and Z denotes an anion selected from the group consisting of halogen, sulfate, hydrogen sulfate, phosphate, and nitrate.

10. A process as defined in claim 9, wherein the anions and cations of the reducing agent I and salt OZ are used in interchanged relationship, $[XR_4]$ and $O_nY$.

* * * * *

UNITED STATES PATENT AND TRADEMARK OFFICE
CERTIFICATE OF CORRECTION

PATENT NO. : 5,817,592
DATED : October 6, 1998
INVENTOR(S) : HEINEKE et al.

It is certified that error appears in the above-identified patent and that said Letters Patent is hereby corrected as shown below:

On the cover page, in the abstract, in formula I, "$[XR^4]_nY$" should be --$[XR_4]_nY$--.

On the cover page, in the abstract, line 4 after formula I, "mono-to" should be --mono- to--.

Col. 8, claim 4, line 19, delete "any of".

Col. 8, claim 5, line 23, delete "any of".

Col. 8, claim 8, line 61, "mono-to" should be -- mono- to--.

Col. 8, claim 8, line 63, "radicals $R_4$ be" should be --radicals R may be--.

Col. 10, claim 10, line 3, "$[XR_4]$" should be --$[XR_4]Z$--.

Signed and Sealed this

Second Day of February, 1999

Attest:

Attesting Officer

*Acting Commissioner of Patents and Trademarks*